United States Patent
Campion et al.

[11] Patent Number: 5,979,189
[45] Date of Patent: Nov. 9, 1999

[54] METHOD OF SEPARATING AND GLAZING AN OPTICAL FIBER PREFORM

[75] Inventors: Jean-Florent Campion, Bois-Colombes, France; Jacques Goudeau, Hickory, N.C.; Hélène Jameron, Andresy, France

[73] Assignee: Alcatel Fibres Optiques, Cedex, France

[21] Appl. No.: 08/936,197

[22] Filed: Sep. 23, 1997

[30] Foreign Application Priority Data

Sep. 24, 1996 [FR] France ................... 96 11596

[51] Int. Cl.⁶ .................................. C03B 37/16
[52] U.S. Cl. .................. 65/391; 65/433; 65/56; 65/65
[58] Field of Search ............... 65/433, 391, 56, 65/65

[56] References Cited

U.S. PATENT DOCUMENTS

| | | |
|---|---|---|
| 4,402,720 | 9/1983 | Edahiro et al. . |
| 4,820,321 | 4/1989 | Presby ........................ 65/433 |
| 5,000,771 | 3/1991 | Fleming, Jr. et al. . |
| 5,674,305 | 10/1997 | Ohga ........................ 65/65 |

FOREIGN PATENT DOCUMENTS

| | | |
|---|---|---|
| 0216338A2 | 4/1987 | European Pat. Off. . |
| 0658520A1 | 6/1995 | European Pat. Off. . |
| 0719738A2 | 7/1996 | European Pat. Off. . |
| 0727392A1 | 8/1996 | European Pat. Off. . |
| 2589461A1 | 5/1987 | France . |
| 2446264 | 8/1990 | France . |

*Primary Examiner*—John Hoffmann
*Attorney, Agent, or Firm*—Sughrue, Mion, Zinn, Macpeak & Seas, PLLC

[57] ABSTRACT

The method of manufacturing a preform having a supporting core by effecting successive passes with a plasma torch while material is being supplied, and by effecting at least one glazing step with the plasma torch and without material being supplied includes:

a) a first glazing step effected at slow speed from a first end of the preform to the second end thereof;

b) pre-separation of the preform adjacent to the first end, thereby reducing its diameter to substantially that of the supporting core;

c) a second glazing step effected from the first end to the second end of the preform; and d) complete separation of the preform at the place of pre-separation.

6 Claims, 1 Drawing Sheet

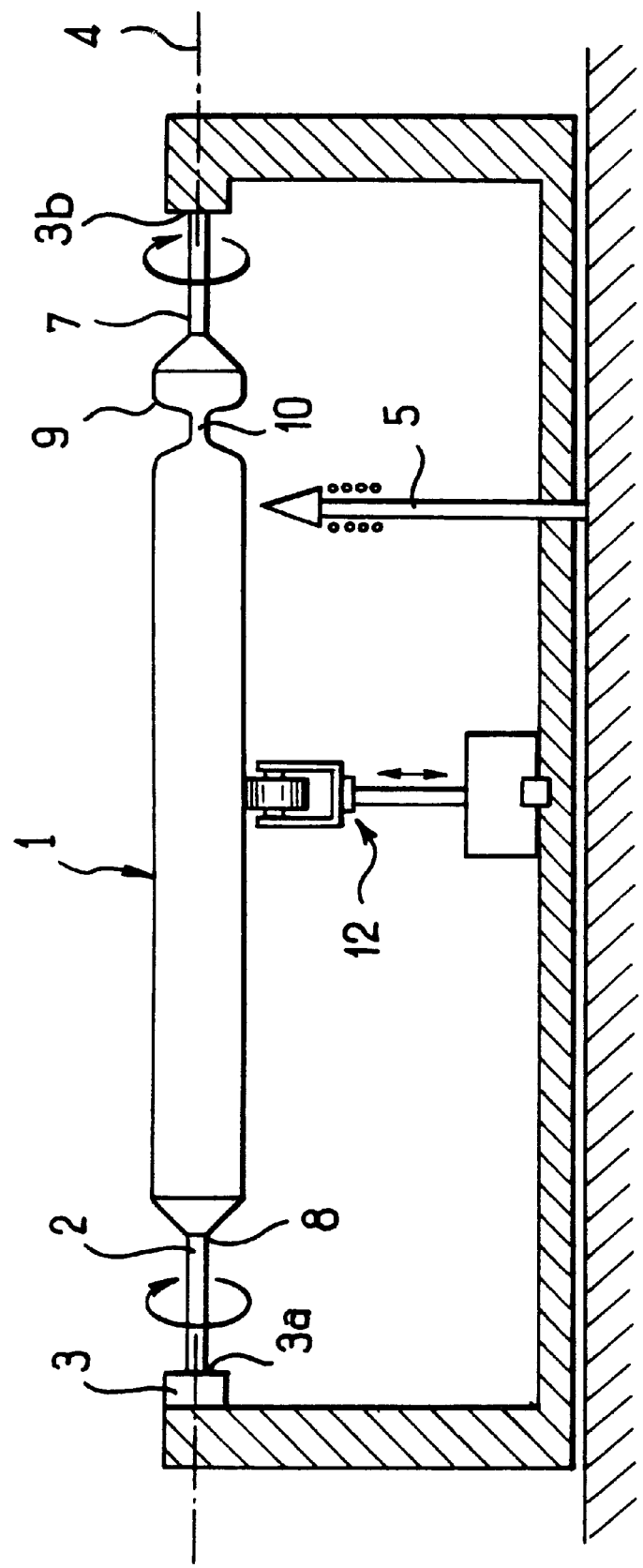

METHOD OF SEPARATING AND GLAZING AN OPTICAL FIBER PREFORM

BACKGROUND OF THE INVENTION

The invention relates to a method of manufacturing an optical fiber preform in an installation for manufacturing or building up preforms having supporting cores. Such an installation includes rotation means having a horizontal axis of rotation and two mounting points between which the supporting core of the preform to be manufactured or built up is mounted, plasma-torch and material-supply means disposed radially relative to said supporting core and mounted to move in axial translation relative to and parallel to the supporting core so as to make said preform around said supporting core. The preform is manufactured or built up by effecting successive passes with the plasma torch while material is being supplied.

During the above step, a portion of the feed material that has not attached to the preform generates soot. In known manner, such installations are equipped with suction hoods which suck up the soot so as to prevent it from being deposited on the preform.

The manufacturing or building-up step is followed by a separation step in which the preform is cut transversely at one of its ends so that it can be removed from the installation.

During the separation step, the temperature of the separation zone of the preform is raised by means of the plasma torch or by means of a blow torch so as to make the separation zone ductile, and then the ductile separation zone is drawn until the preform is actually separated from its end-piece.

Apart from the soot generated by the material that has not attached to the preform, during the manufacturing or building-up step and during the separation step, the peripheral surface of the preform is heated by the plasma torch to a temperature such that the material making up the preform evaporates and condenses in the vicinity of said surface. The material evaporates, and then cools as it rises and condenses, thereby forming soot that falls back onto the preform.

Thus, during the last pass of the manufacturing or building-up step, soot is generated which, once deposited on the preform, significantly reduces the quality of the surface state of the preform. This results in an increase in roughness, and affects the transparency of the preform.

Likewise, during the separation step, heating the separation zone gives rise to soot deposition in the vicinity of the separation zone.

In order to remedy these drawbacks, an additional step is performed, whereby the preform is consolidated by means of a blow torch. This additional step significantly lengthens the preform manufacturing time because, in order to perform the additional step, the preform must have cooled sufficiently for it to be possible for an operator to consolidate the surface with a blow torch. Any reduction in cooling time considerably increases the risks of accident for the operator. However, locally re-heating a cooled preform during the surface consolidation step can have major consequences on the preform in the re-heated zone. In particular, cracks can occur. Therefore, a compromise must be struck between quality and safety because of the human presence during the vitrification stage.

In a method described in the Applicant's Document FR-A-2 730 505, after the plasma torch passes with material being supplied have been effected, and/or after the preform has been separated, at least one glazing step in which at least one glazing pass is effected automatically and without cooling the preform, which pass is effected with a plasma torch and without material being supplied so as consolidate deposits comprising condensation soot.

Such glazing, or heat polishing, makes it possible to eliminate imperfections (such as improperly melted grains).

In order to prevent soot from being re-deposited during such glazing (re-deposition of silica might pollute the fiber-drawing oven), a high glazing speed, approximately in the range 80 mm/min to 90 mm/min, should ideally be used. But such a glazing speed would give rise to unacceptable stresses in the preform, because the temperature in the preform would not be high enough to relax the stresses. Such a high speed would thus give rise to high risks of cracking or breaking, thereby reducing the life-span of the fiber.

Glazing is therefore generally performed at a mean speed of 40 mm/min, that speed being a compromise between the various requirements.

Unfortunately, although it is generally satisfactory, that prior art method still carries risks of re-deposition, in particular while the preform is being separated.

OBJECT AND BRIEF SUMMARY OF THE INVENTION

An object of the invention is to improve that known method still further.

The invention provides a method of manufacturing a preform in an installation for manufacturing or building up preforms having supporting cores, said installation including at least rotation means having a horizontal axis of rotation and two mounting points between which the supporting core of the preform to be manufactured or built up is mounted, plasma-torch and material-supply means disposed radially relative to said supporting core and mounted to move in axial translation relative to and parallel to the supporting core so as to make said preform around said supporting core, said preform being manufactured or built up by effecting successive passes with the plasma torch while material is being supplied, said method including, after the plasma torch passes with material being supplied have been effected, at least one glazing step in which at least one pass is effected automatically and without cooling the preform, which pass is effected with a plasma torch and without material being supplied so as consolidate deposits comprising condensation soot;

said method including:
 a) a first glazing step effected at slow speed from a first end of the preform to the second end thereof;
 b) pre-separation of the preform adjacent to the first end;
 c) a second glazing step effected from the first end to the second end of the preform; and
 d) complete separation of the preform at the place of pre-separation.

The glazing speed of the first step lies approximately in the range 20 mm/min to 25 mm/min. The first glazing step and/or the second glazing step is/are preferably effected with the plasma torch.

Advantageously, during pre-separation, the diameter of the preform is reduced to substantially that of the supporting core.

BRIEF DESCRIPTION OF THE DRAWING

Other advantages and characteristics of the present invention appear from the following description given with reference to the accompanying drawing, in which the sole FIGURE diagrammatically shows a preform undergoing manufacture according to the method of the invention.

MORE DETAILED DESCRIPTION

The method of the invention is intended to be implemented in a prior art installation for manufacturing or building up a preform 1 having a central supporting core 2. In known manner, such an installation includes at least rotation means 3 having a horizontal axis of rotation 4 and receiving the supporting core 2 of the preform 1 to be manufactured or to be built-up, and plasma-torch and material-supply means 5 disposed radially relative to said supporting core 2. In known manner, the installation makes it possible for the plasma-torch and material-supply means 5 to move in axial translation relative to and parallel to the supporting core 2 so as to make the preform 1 around the supporting core 2.

In the implementation shown in the FIGURE, the rotation means 3 are disposed on a frame that is mounted to move in translation parallel to the axis of rotation 4, with the plasma-torch and material-supply means 5 being fixed.

The preform being manufactured or built up is thus moved in translation with the frame to which it is attached at two abutment points constituted by the mounting points 3a, 3b at which the supporting core 2 is mounted on the rotation means 3.

The preform is thus manufactured by causing the preform to effect a plurality of passes facing the plasma-torch and material-supply means.

Advantageously, the installation may include controlled support means 12 disposed between the two mounting points 3a, 3b, and constituting additional abutment points for the preform 1. Thus, by appropriately choosing the position of the controlled support means, it is possible to reduce the sag due to the mass of the preform being manufactured or built up.

The controlled support means and operation thereof are described in the Applicant's French Patent Application No. 94 13 378.

After the preform manufacturing or building-up passes, soot deposits due to evaporation and condensation remain on the preform 1 itself and on those portions of the supporting core 2 that have not been subjected to the manufacturing or building-up passes.

A first glazing pass is effected automatically and without cooling the preform, which pass is effected with the plasma torch 5 and without material being supplied, from the first end 7 to the second end 8 of the preform 1 at a slow speed, typically lying the range 20 mm/min to 25 mm/min.

The glassmaker's lathe is then displaced without heating the preform, to bring the torch 5 to the place 9 at which separation is to be effected, adjacent to the first end 7.

Separation is then started using the conventional method (heating then drawing), and it is stopped once the diameter at 9 as been reduced considerably while leaving a segment of material 10 that is thick enough to support the preform. The diameter of the segment 10 may advantageously be the same as that of the supporting core 2 at the ends 7 and 8 (about 30 mm instead of the 60 mm to 70 mm of the initial preform).

The torch 5 is passed over the preform 1 again, from the first end 7 or at least from the place of separation 9, so as to eliminate the silica deposited during the pre-separation step (in particular in the vicinity of the segment 10), and during the preceding glazing step.

Finally the torch 5 is returned to the place of separation 9 to complete separation rapidly.

The resulting preform is totally transparent (no re-deposition), and exempt from additional stresses. Its surface state is flawless.

The method of the invention generally concerns building up a preform using plasma, but it is also applicable to manufacturing a perform using plasma.

We claim:

1. A method of manufacturing a preform in an installation for manufacturing or building up preforms having supporting cores, said installation including at least rotation means having a horizontal axis of rotation and two mounting points between which the supporting core of the preform to be manufactured or built up is mounted, plasma-torch and material-supply means disposed radially relative to said supporting core and mounted to move in axial translation relative to and parallel to the supporting core so as to make said preform around said supporting core, said preform being manufactured or built up by effecting successive passes with the plasma torch while material is being supplied, said method including, after the plasma torch passes with material being supplied have been effected, at least one glazing step in which at least one pass is effected automatically and without cooling the preform, which pass is effected with a plasma torch and without material being supplied so as to consolidate deposits comprising condensation soot;

said method including sequential steps of:
 a) a first glazing step effected at slow speed from a first end of the preform to a second end thereof;
 b) pre-separation of the preform adjacent to the first end;
 c) a second glazing step effected from the first end, or at least from the place of pre-separation, to the second end of the preform; and
 d) complete separation of the preform at the place of pre-separation;
 wherein, during pre-separation, the diameter of a portion the preform is reduced to substantially that of the supporting core.

2. A method according to claim 1, wherein the glazing speed of the first glazing step lies approximately in the range 20 mm/min to 25 mm/min.

3. A method according to claim 1, wherein at least one of the first and second glazing steps is effected with the plasma torch.

4. A method of manufacturing a preform comprising the following sequential steps:
 forming a preform around a supporting core by applying heat and simultaneously supplying a material for forming the preform;
 a first glazing step in which the preform is heated from a first end to a second end thereof without supplying the material for forming the preform;
 a pre-separation step in which a portion of the preform at the first end is reduced in diameter;
 a second glazing step in which the preform is heated again from the first end, or at least from the reduced diameter portion, to the second end thereof; and
 a complete separation step in which the preform is separated at the reduced diameter portion.

5. A method of manufacturing a preform in an installation for manufacturing or building up preforms having supporting cores, said installation including at least rotation means having a horizontal axis of rotation and two mounting points between which the supporting core of the preform to be manufactured or built up is mounted, plasma-torch and material-supply means disposed radially relative to said supporting core and mounted to move in axial translation relative to and parallel to the supporting core so as to make said preform around said supporting core, said preform being manufactured or built up by effecting successive passes with the plasma torch while material is being supplied, said method including, after the plasma torch passes with material being supplied have been effected, at least one glazing step in which at least one pass is effected automatically and without cooling the preform, which pass is effected with a plasma torch and without material being supplied so as to consolidate deposits comprising condensation soot;

said method including sequential steps of:
a) a first glazing step effected at slow speed from a first end of the preform to a second end thereof;
b) a pre-separation step comprising reducing the diameter of a portion of the preform adjacent to the first end;
c) a second glazing step effected from the first end, or at least from the place of pre-separation, to the second end of the preform; and
d) complete separation of the preform at the place of pre-separation.

6. A method of manufacturing a preform comprising the following sequential steps:

first step of heating a surface of a preform to consolidate deposits;

second step of heating the preform at a first section near an end and causing the preform to reduce its diameter at the first section;

third step of heating the surface of the preform to consolidate deposits which result from the second heating step; and fourth step of heating the preform at the first section to cause a division or break in the preform at the first section.

* * * * *